US010640019B1

(12) United States Patent
St. Onge

(10) Patent No.: US 10,640,019 B1
(45) Date of Patent: May 5, 2020

(54) CHILD CAR SEAT WITH TEMPERATURE CONTROL

(71) Applicant: Kyle C. St. Onge, Versailles, IN (US)

(72) Inventor: Kyle C. St. Onge, Versailles, IN (US)

(*) Notice: Subject to any disclaimer, the term of this patent is extended or adjusted under 35 U.S.C. 154(b) by 0 days.

(21) Appl. No.: 16/108,223

(22) Filed: Aug. 22, 2018

(51) Int. Cl.
*A47C 1/08* (2006.01)
*B60N 2/28* (2006.01)
*A47C 7/74* (2006.01)
*B60N 2/56* (2006.01)

(52) U.S. Cl.
CPC .............. *B60N 2/286* (2013.01); *A47C 7/744* (2013.01); *A47C 7/748* (2013.01); *B60N 2/2881* (2013.01); *B60N 2/5692* (2013.01)

(58) Field of Classification Search
CPC .......... A47C 7/748; A47C 7/744; B60N 2/56; B60N 2/2821; B60N 2/2806; B60N 2/28; B60N 2/5621; B60N 2/2845; B60N 2/5642; B60H 1/00285
USPC ... 297/180.1, 180.14, 180.13, 180.12, 250.1, 297/180.11, 217.1
See application file for complete search history.

(56) References Cited

U.S. PATENT DOCUMENTS

| 5,934,748 | A | * | 8/1999 | Faust | B60N 2/5635 |
| | | | | | 297/180.1 |
| 6,160,057 | A | * | 12/2000 | Webster | C08F 8/32 |
| | | | | | 525/328.9 |
| 7,320,223 | B1 | * | 1/2008 | Dabney | B60N 2/28 |
| | | | | | 62/244 |
| 7,467,823 | B2 | * | 12/2008 | Hartwich | B60H 1/00285 |
| | | | | | 297/180.14 |
| 7,475,938 | B2 | | 1/2009 | Stoewe et al. | |
| 10,166,890 | B1 | * | 1/2019 | Beard | B60N 2/5657 |
| 2002/0096915 | A1 | * | 7/2002 | Haupt | B60H 1/00285 |
| | | | | | 297/180.13 |
| 2004/0118555 | A1 | * | 6/2004 | Fristedt | B60H 1/00285 |
| | | | | | 165/202 |
| 2005/0200166 | A1 | * | 9/2005 | Noh | B60N 2/5642 |
| | | | | | 297/180.14 |
| 2005/0257541 | A1 | * | 11/2005 | Kadle | B60H 1/00285 |
| | | | | | 62/186 |
| 2007/0193279 | A1 | * | 8/2007 | Yoneno | B60N 2/5635 |
| | | | | | 62/3.3 |
| 2007/0234742 | A1 | * | 10/2007 | Aoki | B60H 1/00285 |
| | | | | | 62/3.3 |
| 2010/0133883 | A1 | * | 6/2010 | Walker | A47C 7/74 |
| | | | | | 297/180.1 |
| 2018/0072205 | A1 | * | 3/2018 | Suarez | B60N 2/5635 |

* cited by examiner

*Primary Examiner* — Chi Q Nguyen
(74) *Attorney, Agent, or Firm* — Sanchelima & Associates, P.A.; Christian Sanchelima; Jesus Sanchelima

(57) ABSTRACT

The present invention is a child car seat that effectively controls the temperature of the seat for a child seated on the child car seat. The child car seat includes a base unit that is fixed and a cushion unit that is mounted on the base unit. The base unit includes a fan and a duct system with plurality of openings to circulate and blow air towards the surface of the child car seat for cooling and drying purpose. The cushion unit includes a heating element sealed within the cushion unit and adhered to the foam of the cushion unit. Upon mounting the cushion unit, the power supply is activated to the child car seat and the child car seat can be controlled through a wireless remote controller to change temperature of the child car seat.

9 Claims, 4 Drawing Sheets

US 10,640,019 B1

CHILD CAR SEAT WITH TEMPERATURE CONTROL

BACKGROUND OF THE INVENTION

1. Field of the Invention

The present disclosure relates to a child car seat with temperature control for a child seated on the child car seat. More particularly, the present disclosure relates to a child car seat for heating and cooling the surface of the child car seat.

2. Description of the Related Art

Generally, on long trips, a child or an infant is seated for a prolonged duration on a child seat within a car. Owing to several factors, such as external weather conditions and continuous contact of child with surface of the child seat, the child feels uncomfortable. For instance, during cold weather, the child may feel the surface of the child seat to be cold and wet. Hence, there is a need of a child seat to regulate the temperature based on the external weather conditions.

Several designs for regulating temperature of the child seat have been designed in the past. None of them, however, includes a combination of a heating element and a fan to regulate the temperature of the child seat.

Applicant believes that a related reference corresponds to a US granted U.S. Pat. No. 7,320,223B1 filed by National Aeronautics and Space Administration (NASA) for controlling environment of a child safety seat in a car. The patent '223 discloses a child safety seat including multiple thermoelectric elements for heating and cooling effect, and a ventilator to move the air past a portion of each thermoelectric element and filter the air and pass to one or more jets. The jets are positioned to direct the warm or cold air to the vicinity of the child head seated on the child safety seat. However, the design disclosed in '223 patent is different and complex, and describes controlling the air around the child.

Another related application is U.S. Pat. No. 7,475,938 by WET automotive systems AG for providing a ventilated seat in a car. The patent '938 discloses a car seat with a padded seat surface and a padded backrest having a fan arranged beneath the seat surface. The fan is connected to an air distribution system in the seat and includes a flow region open to the environment. The flow region is located within the side of the fan facing the seat surface. However, the design disclosed in the reference '938 is different and lacks a heating element for heating or warming the seat surface.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a child car seat that is easy and safe to use and that controls the temperature of the seat efficiently to warm the surface of the seat on which a child sits.

It is yet another object of the present invention to provide a child car seat to efficiently ventilate and cool the child car seat using a fan and a duct system having a plurality of openings for distributing the air in the interior region of the child car seat.

It is still another object of the present subject matter to provide a child car seat that is remotely controlled through a wireless remote controller for temperature regulation and control.

It is another object of the present invention to provide a child car seat that is convenient for use and includes a base unit and a cushion unit. The cushion unit is detachably attached to the base unit and can be used for carrying a child with ease when detached from the base unit.

It is another object of the present invention to provide a child car seat having a heating element placed along the inner region of the child car seat and the duct system placed within the peripheral region to allow efficient flow of air for cooling the child car seat.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
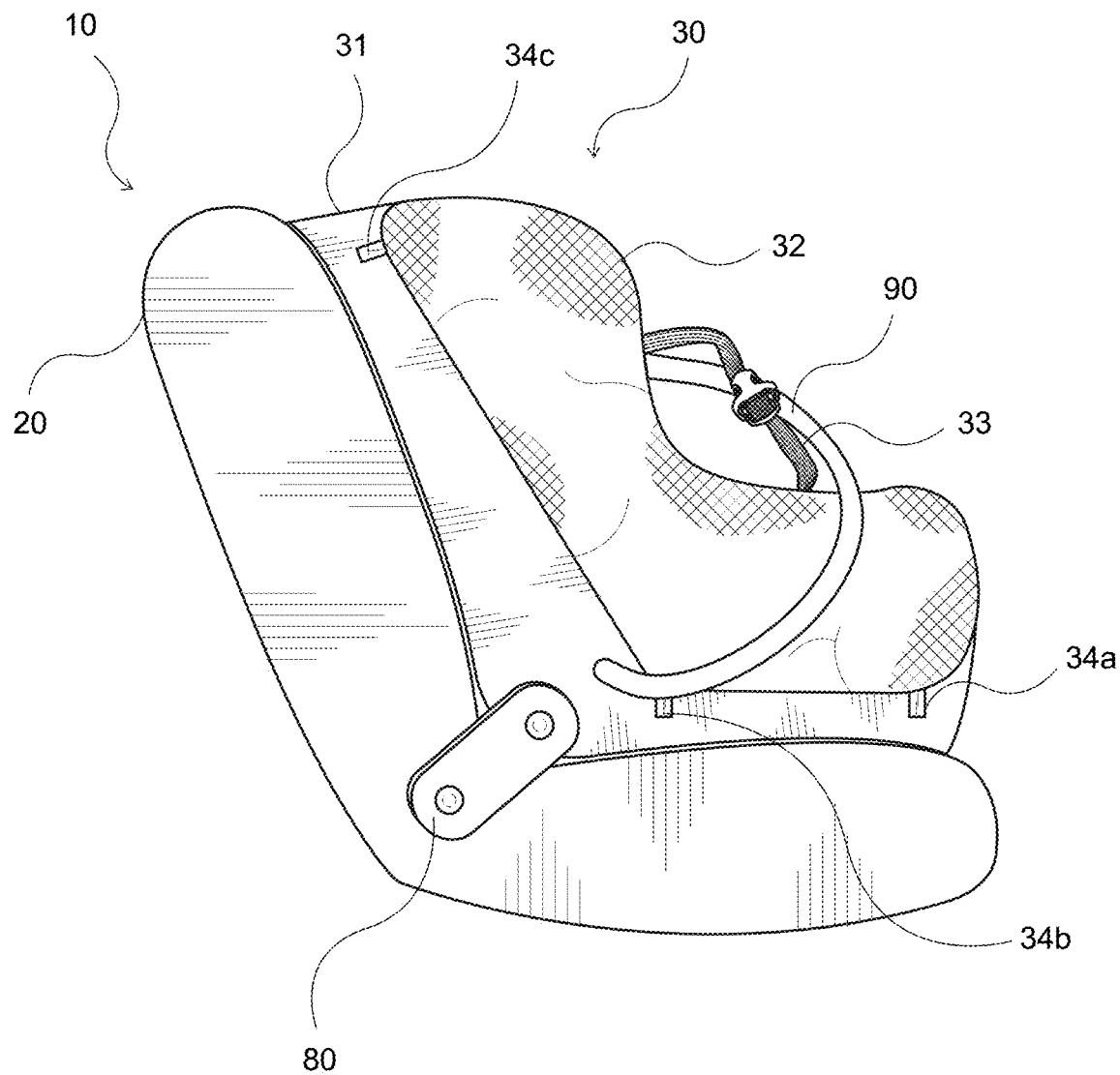
FIG. 1 represents a schematic view of the present invention in its operating environment showing the car seat on which the child car seat is positioned. The child car seat is shown to include a base unit coupled to the car seat and a cushion unit coupled to the base unit.
Figure 2:
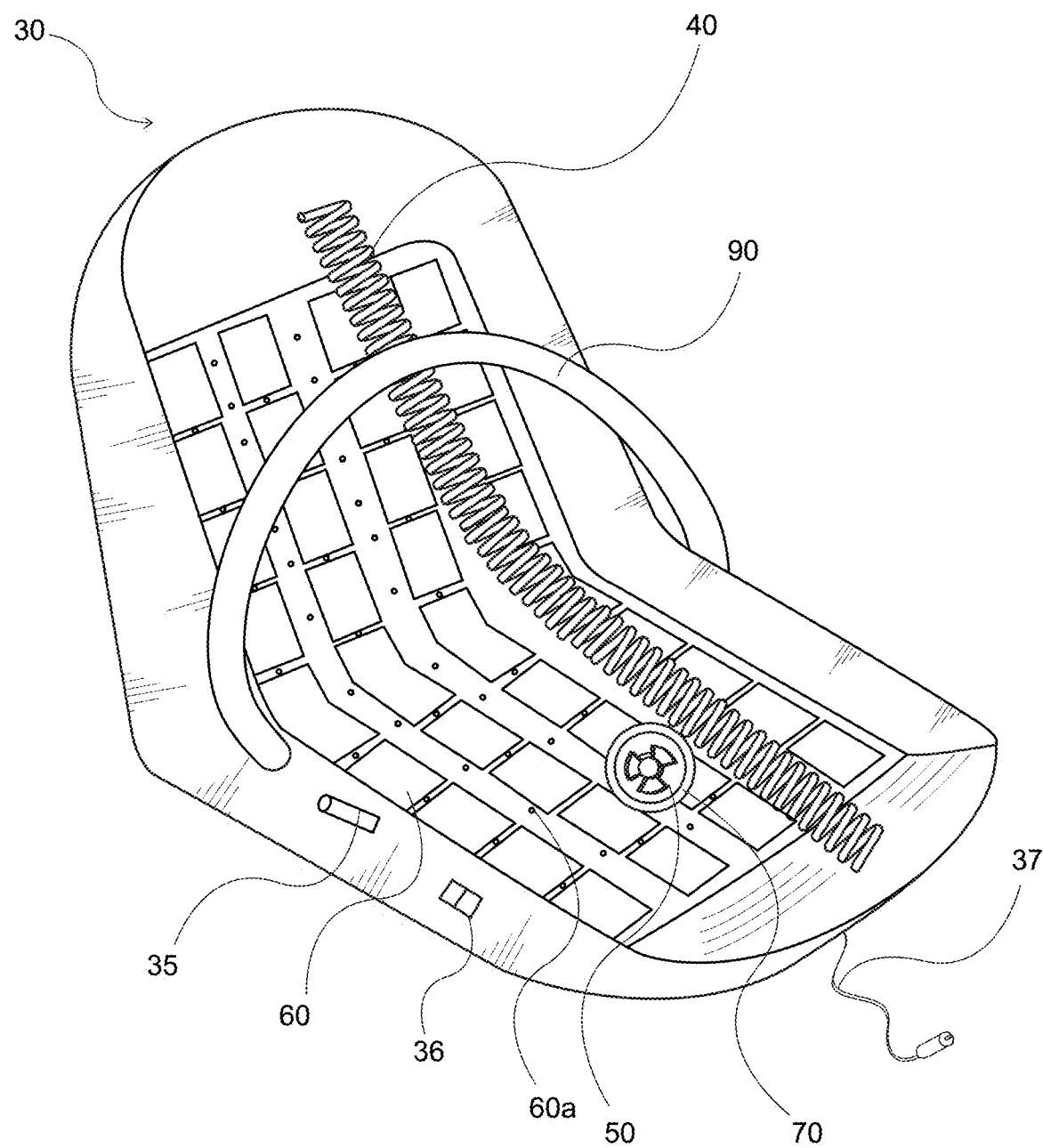
FIG. 2 represents an isometric view of the child car seat with the base unit 31, a cushion unit 32, the base unit 31 including a fan 50 and a duct system 60 for cooling the child car seat.
Figure 3:
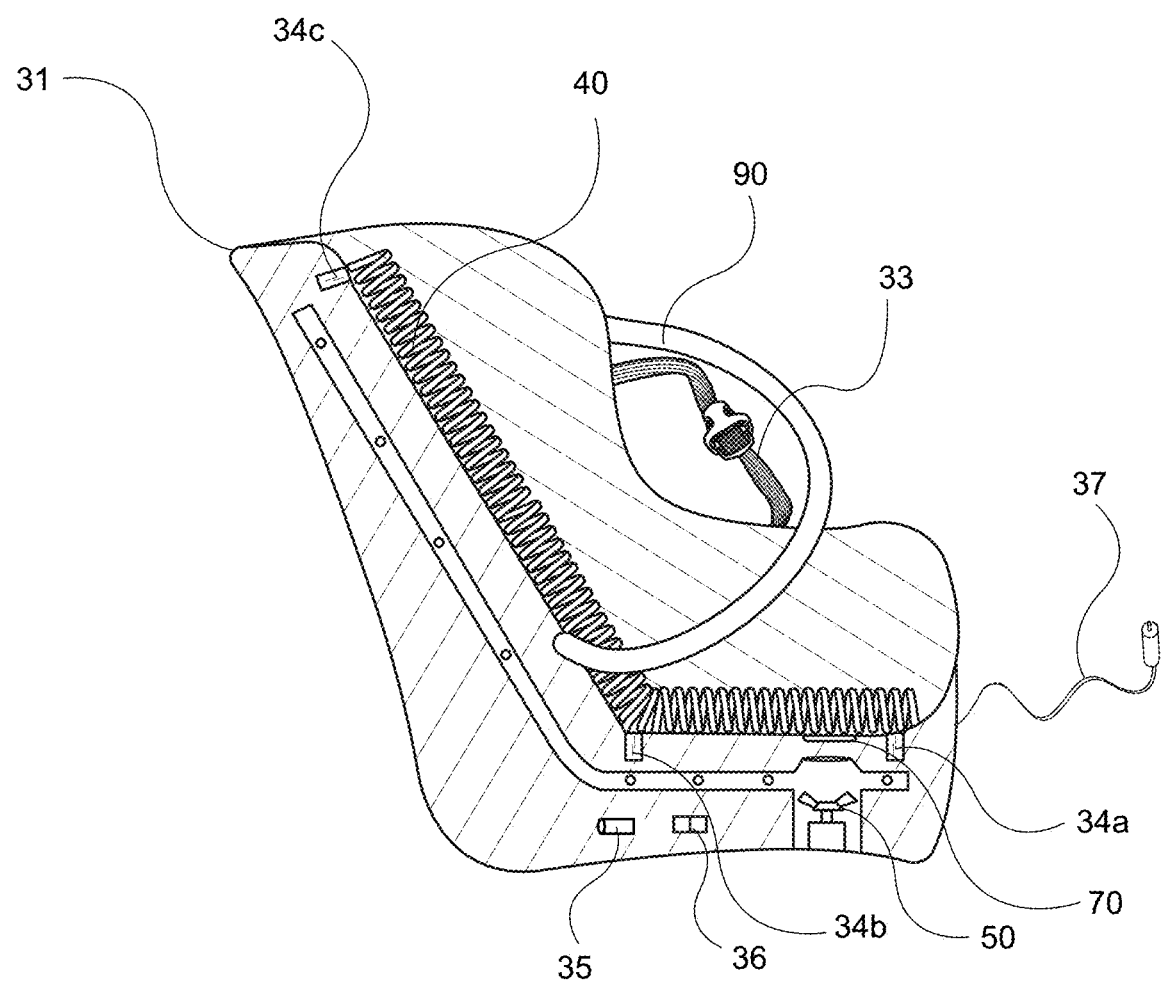
FIG. 3 shows a side elevational view of the child car seat with the base unit 31 including a lever 35 adapted to attach and detach the cushion unit 32 from the base unit 31.
Figure 4:
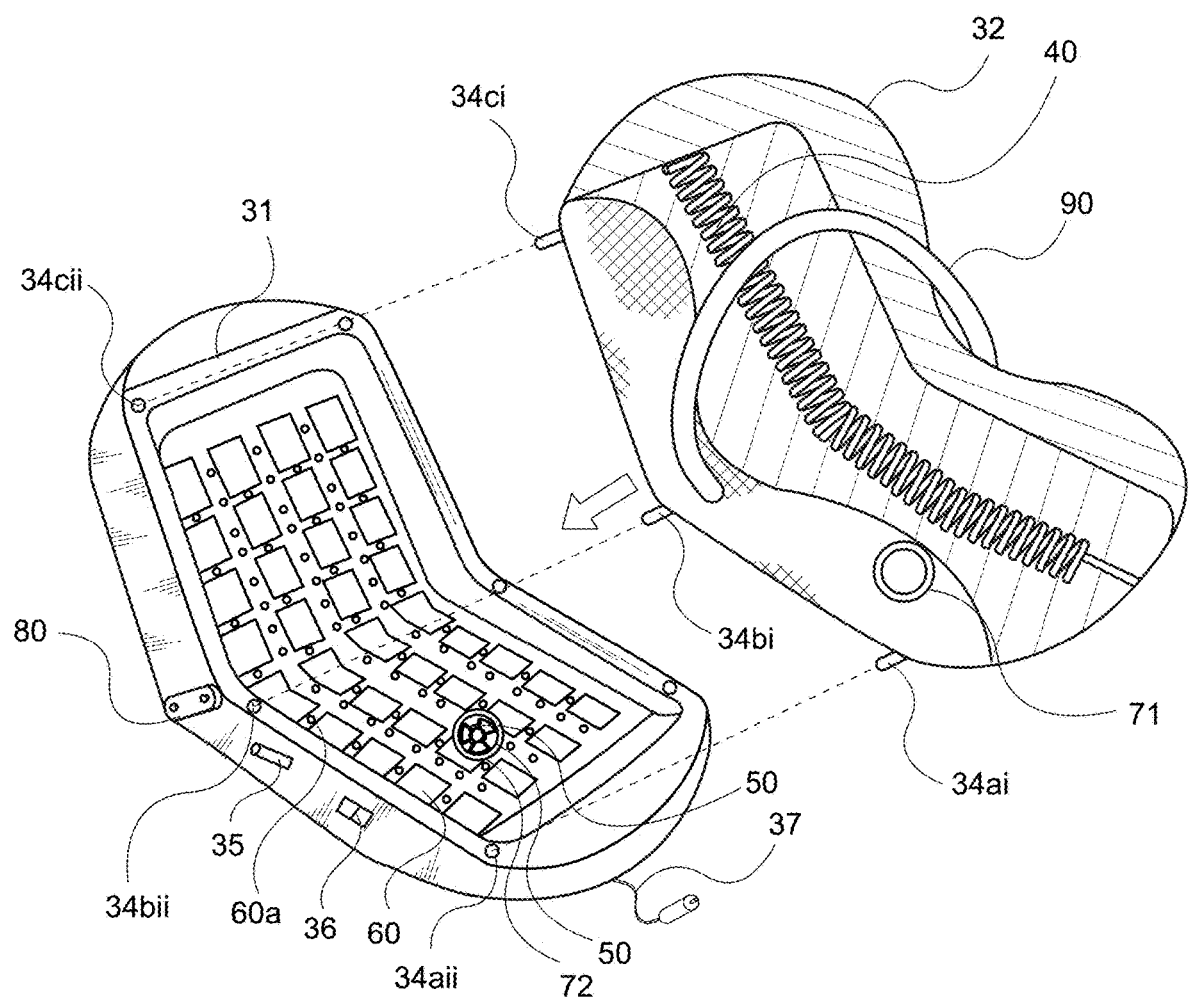
FIG. 4 illustrates an exploded view of the child car seat with the base unit 31 separated from the cushion unit 32. The base unit 31 includes the fan 50 and the duct system 60 molded into the body of the base unit 31 and the cushion unit 32 includes the heating element 40.

Referring now to the drawings, FIGS. 1-4, where the present invention is generally referred to with numeral 10, it can be observed that a car seat 20 is coupled to a child car seat 30, in accordance with one embodiment. Temperature controlled child car seat 30 includes a base unit 31, a cushion unit 32, and a seat belt 33 for securely holding a child seated on the child car seat 30. Temperature controlled child car seat can have 9 inches height, 28 inches length and 15 inches width, and can have an oblong shape.

Base unit 31 includes a metallic or polymeric frame structure that is coupled to the car seat 20 through a coupling 80 and remains stationary. Base unit 31 includes a fan 50 and a duct system 60 molded into the metallic or polymeric frame of the base unit 31. Duct system 60 is coupled to fan 50 and comprises multiple ducts forming a mesh-like structure that extends along the length of child car seat 30 from the base of the seat to the top of the backrest of the child car seat 30. Duct system 60 comprises evenly distributed multiple openings, collectively referred to as 60a, on the surface of the ducts. Openings 60a are distributed such that air is circulated to every portion and area of the child car seat 30 for cooling and drying purpose. Fan 50 is surrounded by a rubber arch 70, which includes a top rubber element 71 in the cushion unit 32 and a bottom rubber element 72 in the base unit 31. The top rubber element 71 and the bottom rubber element 72 combine to seal the fan 50 when the cushion unit 32 is placed on the base unit 31.

Fan 50 is coupled to the duct system 60 such that the air flows through ducts of the duct system 60 and flows out towards the surface of the seat from beneath the surface of the child car seat 30 on which a child is seated. Fan 50 and duct system 60 are configured within base unit 31 such that fan 50 is within the inner region beneath the surface of the child car seat 30 and the ducts are within the inner region beneath the surface of the child car seat 30 to allow optimum distribution of the air and cooling of the child car seat 30.

Cushion unit 32 can be made of a plastic material, or a polyester material, or a mesh type fabric material and includes a heating element 40 placed beneath the foam and adhered to the foam of cushion unit 32. Heating element 40 can be a heating coil placed along the length of the cushion unit 32. The heating element 40 is coupled to a temperature sensor (not illustrated in Figures) that detects the temperature of the child car seat 30 and is controllable through a wireless remote controller to change the temperature of heating element 40 based on user input. Temperature sensor is also coupled to fan 50 to switch fan 50 on and off based on signals received from the wireless remote controller. Cushion unit 32 also includes a movable handle 90 which can be adjusted in different angular positions to allow easy carrying of the cushion unit 32 in a detached state from the base unit 31.

Cushion unit 32 includes locking elements 34$ai$, 34$bi$, and 34$ci$ on the bottom surface of cushion unit 32 facing base unit 31. Base unit 31 includes receiving holes 34$aii$, 34$bii$ and 34$cii$ on the metallic/polymeric frame of base unit 31 and a lever 35 adapted to actuate locking and unlocking of the locking elements 34$ai$, 34$bi$, and 34$ci$ in the corresponding receiving holes 34$aii$, 34$bii$ and 34$cii$.

Cushion unit 32 can be detachably coupled to base unit 31 through locking elements 34$ai$, 34$bi$, and 34$ci$. For attaching cushion unit 32 with base unit 31, each locking element 34$ai$, 34$bi$, and 34$ci$ is inserted into corresponding receiving holes 34$aii$, 34$bii$ and 34$cii$ on base unit 31 to safely and firmly position cushion unit 32 on base unit 31. In one example, there is a light indicator 36 (or other types of indicators) on base unit 31 to glow with a light to indicate that the cushion unit 32 has been safely placed on base unit 31. The light indicator 36 also glows with a light to indicate when the base unit 31 is electrically powered through the battery of the car, utilizing a cigarette/lighter adaptor 37 such that upon attaching cushion unit 32 with base unit 31, base unit 31 is powered up and upon removing the base unit 32, the power is disconnected. When the child car seat 30 is powered, then the temperature can be regulated using the wireless remote controller. The temperature control can be set from 30 minutes to 1 hour for heating and cooling between a temperature range of 65° Fahrenheit (F) to 80° F. For detaching cushion unit 32, lever 35 is actuated to unlock the locking elements 34$ai$, 34$bi$, and 34$ci$ from the corresponding receiving holes 34$aii$, 34$bii$ and 34$cii$.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A child car seat comprising:
   a. a base unit, a car seat, said base unit connected to said car seat, said base unit defined with at least one fan and a duct system; and
   b. a cushion unit positionable on and removably connected with said base unit and defined with a surface extending from a seat to a backrest, said base unit defined with at least one heating coil disposed underneath said surface to selectively heat said surface, wherein, said duct system configured to selectively circulate fan-cooled air underneath said surface for cooling said surface.

2. The child car seat as claimed in claim 1, wherein said duct system comprises multiple ducts with multiple openings.

3. The child car seat as claimed in claim 1, wherein said fan is surrounded by a rubber arch.

4. The child car seat as claimed in claim 1, wherein said base unit is defined with receiving holes and said cushion unit is defined with locking elements, said locking elements are inserted in corresponding receiving holes to establish locking between said base unit and said cushion elements, said locking elements are detached from said receiving holes by operating a lever.

5. The child car seat as claimed in claim 4, further includes an indicator for indicating said base unit is locked with said cushion unit.

6. The child car seat as claimed in claim 1, wherein said cushion unit is defined with a movable handle adjustable in different angular positions to carry said cushion unit in a detached state from said base unit.

7. A child car seat, comprising:
   a. a base unit, a car seat, said base unit connected to said car seat, said base unit defined with at least one fan and a duct system, said fan surrounded by a rubber arch, said duct system comprises multiple ducts with multiple openings;
   b. a cushion unit positionable on and removably connected with said base unit and defined with a surface extending from a seat to a backrest, said base unit defined with at least one heating coil disposed underneath said surface to selectively heat said surface, wherein, said duct system configured to selectively circulate fan-cooled air underneath said surface for cooling said surface; and
   c.
   d.
   e. said base unit is defined with receiving holes and said cushion unit is defined with locking elements, said locking elements are inserted in corresponding receiving holes to establish locking between said base unit and said cushion elements and said locking elements are detached from said receiving holes by operating a lever.

8. The child car seat as claimed in claim 7, further includes an indicator for indicating said base unit is locked with said cushion unit.

9. The child car seat as claimed in claim 7, wherein said cushion unit is defined with a movable handle adjustable in different angular positions to carry said cushion unit in a detached state from said base unit.

* * * * *